Jan. 27, 1925.
A. PIEL
1,524,565
MUFFLER CUT-OUT
Filed July 20, 1922
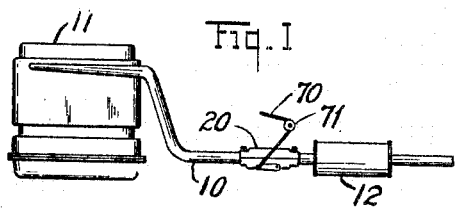
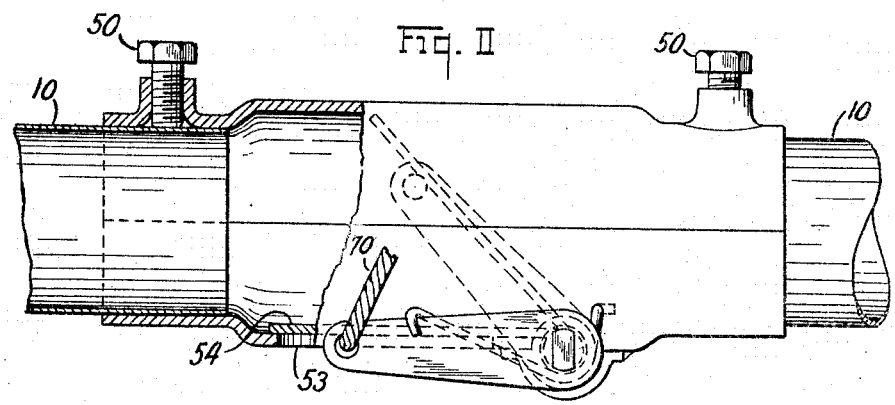
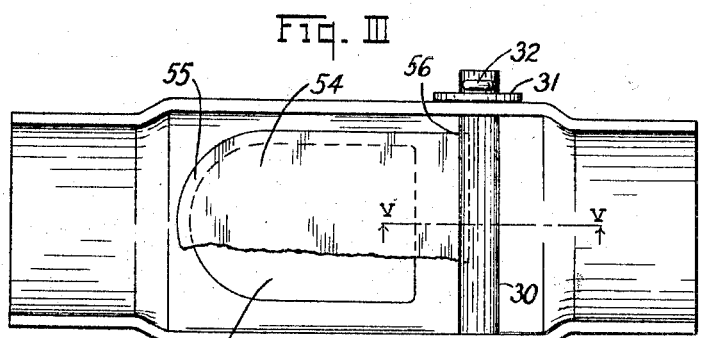
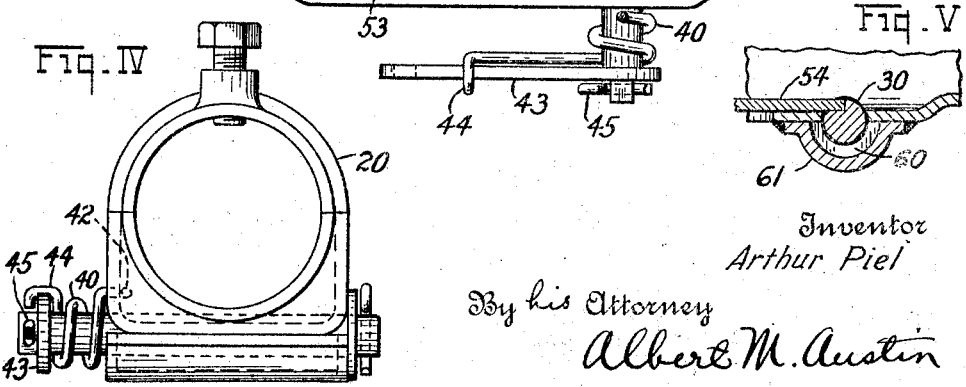
Inventor
Arthur Piel
By his Attorney
Albert M. Austin Patented Jan. 27, 1925.

1,524,565

UNITED STATES PATENT OFFICE.

ARTHUR PIEL, OF NEW YORK, N. Y.

MUFFLER CUT-OUT.

Application filed July 20, 1922. Serial No. 576,392.

*To all whom it may concern:*

Be it known that I, ARTHUR PIEL, a citizen of the United States, and resident of New York, in the county of New York and State of New York, have invented certain new and useful Improvements in Muffler Cut-Outs, of which the following is a specification.

This invention relates to cut-out valves or cut-outs adapted for use with internal combustion engines for cutting out the muffler thereof.

Some of the objects of the present invention are to provide a simple, efficient and relatively inexpensive muffler cut-out having relatively large radiating surfaces for radiating heat, whereby the temperature of the cut-out is effectually limited; to provide improved means for maintaining the cut-out valve operating shaft in position; to prevent undesired leaks through parts of the cut-out; to provide a cut-out which may be readily and conveniently assembled; and to provide other objects which will appear from the following description taken in connection with the drawing.

Referring to the drawing,—

Figure I shows the muffler cut-out of my invention applied to the exhaust pipe of an internal combustion engine of the type used on certain small automobiles, such as the Ford;

Figure II shows an enlarged view of the cut-out with parts cut away;

Figure III shows a horizontal section taken on the axial line of the exhaust pipe of Figure II;

Figure IV shows an end view of the cut-out before being applied to the exhaust pipe; and Figure V is a detailed sectional view on the line V—V of Figure III.

The cut-out is shown applied to a usual exhaust pipe 10 interconnecting an internal combustion engine of the so-called Ford type 11, and a muffler 12. The cut-out serves to provide at desired times a by-pass or escape from the interior of the cut-out to the atmosphere.

The cut-out is applied by severing the pipe 10 and joining the severed ends thereof by means of the cut-out structure. In the embodiment selected for illustration the cut-out 20 is formed in tubular cross section of a pair of members secured together in any desired manner as by welding, having an inside diameter substantially equal to the outside diameter of the exhaust pipe 10 for which the device is intended.

The cut-out 20 is notched to form a seat or bearing for a bolt comprising a cylindrical shaft 30, one of the ends of which is provided with a washer 31 secured in any suitable manner as by cotter pin 32. The washer 31 bears against the outer surface of the cut-out, the shaft 30 being free to turn upon its axis.

The other end of the shaft 30 is milled so as to have a rectangular cross section for a relatively short distance. A tension spring 40 is wound several times around the portion of the shaft 30 immediately adjacent to the outer surfaces of the cut-out 20. One end 42 of the spring 40 is bent sharply so as to enter a drill hole in the cut-out 20, as clearly shown in Figure IV. A radially extending arm 43 of suitable length to provide leverage, and having a perforation near one of its ends corresponding to the rectangular section of one end of the shaft 30 (see Figure II) is fitted to said end of the shaft, with a bent end 44 of the spring 40 hooked over one lateral edge. The number of turns of the spring 40 encircling the shaft 30 are such that a pressure must be exerted against the arm 43 to force it on the shaft 40 and into the position shown in Figure III, an opposing pressure being applied against opposite end while this operation is performed. A pin 45 maintains the arm 43 in place. The compressional resiliency of the spring is such as to yieldingly press the washer 31 against the outer surface of the cut-out 20. The circumferential resiliency of the spring, which tends to unwind the spring, forces the arm 43 counterclockwise as in Figure II, and restores the arm to the position illustrated after having been displaced therefrom.

The shaft 30 is maintained in position by means of a split bushing 60 which in turn is held by an arcuate member 61. The member may be suitably secured to the main body of the cut-out, as by welding. A seat is thus provided for the shaft 30 permitting its free rotation without permitting gases to escape. For the purpose of securely maintaining the cut-out in position there are provided screw threaded holes through its periphery near the respective ends for the reception of suitable set screws 50 adapted to strongly engage or bite into the pipe 10.

An aperture 53 in one of the walls of the cut-out 20 forms the by-pass or vent through which the exhaust can escape when desired. For normally sealing the aperture 53 there is provided a closure plate 54 corresponding in shape to the aperture 53 and slightly larger in area so as to form a marginal seat 55. The closure plate 54 is secured along one edge 56 to the shaft 30 in any suitable manner as by welding so that the plane of the lower face of the plate (Figure II) is substantially coincident with the plane of the interior surface of the flat wall 52.

For displacing the plate 54 into the position shown in dotted lines in Figure II, there is provided a usual wire cable or rope 70 attached to the free end of the arm 43 and extending around suitable pulleys, such as 71 (see Figure I), to a pedal or operating lever conveniently positioned.

The matter of assembling the cut-out is evident from the foregoing description, it being necessary to assemble the arm 43, spring 40, pin 45 and closure plate 54 to the shaft 30. The shaft 30 is then inserted into the member 61, and the washer 31 and pin 32 are applied thereto to hold it in position.

In operation, the cut-out normally serves merely as a passage for the exhaust gases or other products of combustion emitted by the engine 11 into its exhaust pipe 10. Thus, normally, the gases are directed into the muffler 12, and the compression waves produced by the explosions of an ordinary internal combustion engine are effectually prevented by said muffler from producing excessive noise.

During the normal operation of the engine, which of course prevails much of the time, the cut-out is in the position shown in the drawing, that is, in its closed position. The gases exhausted from the engine are then directed into the muffler and thence to atmosphere, as indicated in Figure I. When it is desired to direct the exhaust gases from the engine to the atmosphere without going through the muffler, the operator actuates a pedal or other device provided for the purpose, and thereby pulls the cable 70. This rotates the arm 43 in a clockwise direction (Figure II) and rotates the shaft 30 in its seat. The closure plate 54 is thereby lifted from its seat and opens the passageway through the aperture 53 to the atmosphere. Upon the release of the operating device the spring 40 retracts the closure plate 54 to its seats. The cable 70 is drawn back to its normal position and the apparatus is then ready for repeated use.

Thus it will be seen that the cut-out invention provides improved means for directing the exhaust gases from an engine to the atmosphere and that the cut-out may be readily and cheaply manufactured. My improved cut-out also provides a means for maintaining the valve closure plate shaft in place, which is simple and rugged, and which effectually prevents undesired escape of gases to the atmosphere.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having described my invention, I claim:

1. In a muffler cut-out adapted to be applied to an exhaust pipe, a pair of members secured together and to spaced portions of said exhaust pipe, a portion of the wall of said cut-out having an aperture, a closure plate for closing said aperture normally, a rotatable shaft secured to said closure plate and arranged upon rotation to displace said closure plate from the aperture, and means for maintaining said shaft in position in the cut-out comprising a curved plate secured to an outer face of the cut-out.

2. In a muffler cut-out adapted to be applied to an exhaust pipe, a pair of members secured together and to spaced portions of said exhaust pipe, a portion of the wall of said cut-out having an aperture, a closure plate for closing said aperture normally, a rotatable shaft secured to said closure plate and arranged upon rotation to displace said closure plate from the aperture, means for maintaining said shaft in position on the cut-out comprising a curved plate secured to an outer face of the cut-out, and resilient means for yieldingly maintaining closure plate in closed position.

3. In a muffler cut-out adapted to be applied to an exhaust pipe, a pair of members secured together and to spaced portions of said exhaust pipe, a portion of the wall of said cut-out having an aperture, a closure plate for closing said aperture normally, a rotatable shaft secured to said closure plate and arranged upon rotation to displace said closure plate from the aperture, means for maintaining said shaft in position on the cut-out comprising a curved plate secured to an outer face of the cut-out, and means for maintaining the shaft in a predetermined position laterally with respect to the cut-out.

4. In a muffler cut-out adapted to be applied to an exhaust pipe, a pair of members secured together and to spaced portions of said exhaust pipe, a portion of the wall of said cut-out having an aperture, a closure plate for closing said aperture normally, a rotatable shaft secured to said closure plate and arranged upon rotation to displace said closure plate from the aperture, means for maintaining said shaft in position in the cut-out comprising a curved plate secured to an outer face of the cut-out, and means for maintaining the shaft in a predetermined position laterally with respect to the cut-out comprising a member of larger diameter than said shaft and positioned at one end thereof outside of the cut-out.

5. In a muffler cut-out adapted to be applied to an exhaust pipe, a pair of members secured together and to spaced portions of said exhaust pipe, a portion of the wall of said cut-out having an aperture, a closure plate for closing said aperture normally, a rotatable shaft secured to said closure plate and arranged upon rotation to displace said closure plate from the aperture, means for maintaining said shaft in position in the cut-out comprising a curved plate secured to an outer face of the cut-out, means for maintaining the shaft in a predetermined position laterally with respect to the cut-out comprising a member of larger diameter than said shaft positioned at one end thereof outside of the cut-out, and a single spring for yieldingly maintaining said enlarged member in intimate contact with the outer surface of the cut-out and for maintaining the closure plate in closed position over the aperture.

6. In a muffler cut-out adapted to be applied to an exhaust pipe, a pair of members secured together and to spaced portions of said exhaust pipe, a portion of the wall of one of said members having an aperture and being flattened to form a valve seat adjacent said aperture, a curved bearing plate secured to an outer face of the cut-out adjacent to said aperture, a rotatable shaft mounted in said bearing plate partly above and partly below the level of the aperture, a closure plate secured to the portion of the shaft above the aperture and adapted to lie parallel with and against said valve seat to close the aperture, and means for actuating the shaft to raise the closure plate and open said aperture.

Signed at New York, in the county of New York, and State of New York, this 10th day of July, 1922.

ARTHUR PIEL.